US009188822B2

(12) United States Patent
Kim et al.

(10) Patent No.: US 9,188,822 B2
(45) Date of Patent: Nov. 17, 2015

(54) CHIP ON GLASS TYPE LCD DEVICE INCLUDING TESTING THIN FILM TRANSISTORS, TESTING LINES AND TESTING PADS AND INSPECTING METHOD OF THE SAME

(75) Inventors: Bung-Goo Kim, Gyeongsangbuk-do (KR); Ka-Kyung Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 298 days.

(21) Appl. No.: 12/640,557

(22) Filed: Dec. 17, 2009

(65) Prior Publication Data
US 2011/0018571 A1    Jan. 27, 2011

(30) Foreign Application Priority Data

Jul. 21, 2009  (KR) .................. 10-2009-0066213

(51) Int. Cl.
*G02F 1/1362* (2006.01)
*G02F 1/1345* (2006.01)
*G09G 3/00* (2006.01)
*G09G 3/36* (2006.01)

(52) U.S. Cl.
CPC ........ *G02F 1/136286* (2013.01); *G02F 1/1345* (2013.01); *G09G 3/006* (2013.01); *G09G 3/3648* (2013.01); *G02F 1/13454* (2013.01)

(58) Field of Classification Search
USPC ......................... 349/149, 151, 152
See application file for complete search history.

(56) References Cited

U.S. PATENT DOCUMENTS

| 6,924,875 | B2 | 8/2005 | Tomita | |
|---|---|---|---|---|
| 2004/0207772 | A1* | 10/2004 | Tomita | ............................ 349/42 |

(Continued)

FOREIGN PATENT DOCUMENTS

JP    2008-009246 A    1/2008

OTHER PUBLICATIONS

Office Action from the Taiwan Advance Patent & Trademark Office dated Nov. 26, 2012 in counterpart application No. 098142608.
(Continued)

*Primary Examiner* — Lauren Nguyen
(74) *Attorney, Agent, or Firm* — Morgan, Lewis & Bockius LLP

(57) ABSTRACT

A COG type LCD device includes a first substrate including a display area and first, second, third and fourth non-display areas, gate and data lines in the display area on the first substrate and defining pixel regions, switching thin film transistor at each crossing portion of the gate and data lines and connected to the gate and data lines, a pixel electrode in each pixel region and connected to the thin film transistor, first testing thin film transistors in the second non-display area connected to the data lines and spaced apart from each other with a constant interval therebetween, first, second and third data testing lines connected to one ends of the data lines through the first testing thin film transistors, first, second and third data testing pads connected to the first, second and third data testing lines, respectively, data link lines in the first non-display area and connected to another ends of the data lines, second testing thin film transistors in the first non-display area and connected to the data link lines, gate link lines connected to the gate lines, third testing thin film transistors connected to the gate link lines, gate testing lines connected to the gate lines through the third testing thin film transistors, gate testing pads connected to the gate testing lines, a common testing line and a common pad in the non-display area, a second substrate spaced apart from the first substrate, a color filter layer and a common electrode sequentially formed on the second substrate, wherein the common electrode is connected to the common testing line, and a liquid crystal layer between the first and second substrates, wherein a driving IC is attached in the first non-display area.

10 Claims, 5 Drawing Sheets

(56) References Cited

U.S. PATENT DOCUMENTS

2006/0285053 A1* 12/2006 Jeoung et al. ............... 349/149
2008/0001885 A1   1/2008  Yanagisawa et al.

OTHER PUBLICATIONS

Office Action dated Mar. 27, 2013 from the Korean Intellectual Property Office in counterpart Korean application No. 10-2009-066213.

* cited by examiner

CHIP ON GLASS TYPE LCD DEVICE INCLUDING TESTING THIN FILM TRANSISTORS, TESTING LINES AND TESTING PADS AND INSPECTING METHOD OF THE SAME

The present application claims the benefit of Korean Patent Application No. 10-2009-0066213 filed in Korea on Jul. 21, 2009, which is hereby incorporated by reference.

BACKGROUND OF THE INVENTION

1. Field of the Invention

The present invention relates to a liquid crystal display (LCD) device, and more particularly to a chip on glass (COG) type LCD device and an inspecting method of the same.

2. Discussion of the Related Art

With the rapid development in information technology, flat panel display (FPD) devices having thin thickness, light weight, and lower power consumption have been introduced and developed.

Among these devices, liquid crystal display (LCD) devices are most widely used for monitors of notebook computers, monitors of personal computers and televisions due to high definition, high qualities, excellent moving images and high contrast ratio.

An LCD device includes two substrates and a liquid crystal layer interposed between the two substrates. Electrodes are formed on respective substrates, and the substrates are disposed such that the electrodes face each other. An electric field is induced between the electrodes when voltages are applied to the electrodes. The alignment direction of the liquid crystal molecules is controlled by varying the intensity of the electric field, and the transmittance of light through the liquid crystal layer is changed to display images.

FIG. 1 is an exploded perspective view of an LCD device according to the related art. As shown in FIG. 1, the LCD device includes an array substrate 10, a color filter substrate 20 and a liquid crystal layer 30. The array substrate 10 and color filter substrate 20 face each other, and the liquid crystal layer 30 is interposed therebetween.

The array substrate 10 includes gate lines 14 and data lines 16 on an inner surface of a transparent substrate 12. The gate lines 14 and the data lines 16 cross each other such that regions formed between the gate and data lines 14 and 16 are defined as pixel regions P. A thin film transistor Tr is formed at each crossing portion of the gate and data lines 14 and 16, and a pixel electrode 18 is formed in each pixel region P and connected to the thin film transistor Tr.

The color filter substrate 20 includes a black matrix 25, a color filter layer 26, and a common electrode 28 on an inner surface of a transparent substrate 22 facing the array substrate 10. The black matrix 25 has a lattice shape to cover a non-display region such as the gate lines 14, the data lines 16, the thin film transistors Tr, and so on. The color filter layer 26 includes red, green and blue color filter patterns 26a, 26b, and 26c repeatedly arranged in order. Each of the color filter patterns 26a, 26b, and 26c corresponds to each pixel region P. The common electrode 28 is formed on the black matrix 25 and the color filter layers 26 and over an entire surface of the substrate 22.

A sealant (not shown) is formed along peripheries of the array substrate 10 and the color filter substrate 20 to prevent liquid crystal molecules of the liquid crystal layer 30 from leaking. An alignment layer (not shown) is formed between the liquid crystal layer 30 and each of the array substrate 10 and the color filter substrate 20 to determine an initial direction of the liquid crystal molecules. A polarizer (not shown) is disposed on an outer surface of at least one of the array substrate 10 and the color filter substrate 20. A backlight unit (not shown) is disposed on an outer surface of the array substrate 10 to provide lights.

Scan signals for turning on/off the thin film transistors Tr are sequentially applied to the gate lines 14, and data signals are applied to the pixel electrodes 18 in the selected pixel regions P through the data lines 16. An electric field perpendicular to the substrates 12 and 22 is induced between the pixel electrodes 18 and the common electrode 28. The arrangement of the liquid crystal molecules is controlled by the electric field, and the transmittance of light is changed by varying the arrangement of the liquid crystal molecules to thereby display images.

In the LCD device, the array substrate, the color filter substrate and the liquid crystal layer may be defined as a liquid crystal panel. The LCD device further includes a driving unit at a periphery of the liquid crystal panel to drive the liquid crystal panel. The driving unit includes a printed circuit board (PCB), on which elements for generating control signals and data signals are mounted, and driving integrated circuits (ICs), which is connected to the liquid crystal panel and the PCB and is used to apply signals to signal lines of the liquid crystal panel.

The LCD device may be categorized into a chip on glass (COG) type, a tape carrier package (TCP) type and a chip on film (COF) type according to a method of packaging the driving ICs on the liquid crystal panel.

The COG type has a simple structure as compared with the TCP type and the COF type and increases the ratio of the liquid crystal panel in the LCD device. Therefore, recently, the COG type has been widely used for a small-sized LCD device.

In the COG type LCD device, driving ICs are attached to a non-display area of an array substrate. The COG type LCD device is inspected to detect defects before attaching the driving ICs. Accordingly, testing lines and pads are formed in the non-display area of the array substrate.

FIG. 2 is a view of schematically illustrating an inspecting structure of a COG type LCD device according to the related art. FIG. 2 shows testing lines, testing pads and testing thin film transistors.

In FIG. 2, the related art COG type LCD device 50 includes a display area DA and a non-display area substantially surrounding the display area DA. Gate lines GL and data lines DL are formed in the display area DA. Gate link lines GLL1, GLL2, GLL3 and GLL4 are formed in the non-display area at left and right sides of the display area DA in the context of the figure, and the gate link lines GLL1, GLL2, GLL3 and GLL4 are connected to the gate lines GL. Data link lines DLL are formed in the non-display area at a lower side of the display area DA in the context of the figure, and the data link lines DLL are connected to the data lines DL. First, second and third testing transistors ITr1, ITr2 and ITr3 and testing pads IP1 to IP12 are formed in the non-display area. The first, second and third testing transistors ITr1, ITr2 and ITr3 are formed between the gate link lines GLL1, GLL2, GLL3 and GLL4 and the testing pads IP1 to IP12 or between the data link lines DLL and the testing pads IP1 to IP12.

The gate lines GL in the display area DA includes odd gate lines GL1 and GL3 and even gate lines GL2 and GL4. The odd gate lines GL1 and GL3 are alternately connected to first and second gate link lines GLL1 and GLL2 in the non-display area at the left side of the display area DA. The even gate lines GL2 and GL4 are alternately connected to third and fourth gate link lines GLL3 and GLL4 in the non-display area at the right side of the display area DA.

Here, first testing thin film transistors ITr1 are respectively connected to the first and second gate link lines GLL1 and GLL2, and a first gate enable line 60 is connected to gate electrodes of the first testing thin film transistors ITr1 and controls on/off of the first testing thin film transistors ITr1. A first gate enable pad IP3 is connected to the first gate enable line 60. Second testing thin film transistors ITr2 are respectively connected to the third and fourth gate link lines GLL3 and GLL4, and a second gate enable line 62 is connected to gate electrodes of the second testing thin film transistors ITr2 and controls on/off of the second testing thin film transistors ITr2. A second gate enable pad IP4 is connected to the second gate enable line 62.

In addition, first and second gate testing lines 51 and 52 are electrically connected to the first and second gate link lines GLL1 and GLL2 through the first testing thin film transistors ITr1. Third and fourth gate testing lines 53 and 54 are electrically connected to the third and fourth gate link lines GLL3 and GLL4 through the second testing thin film transistors ITr2. First, second, third and fourth gate testing pads IP1, IP2, IP5 and IP6 are disposed at ends of the first, second, third and fourth gate link lines GLL1, GLL2, GLL3 and GLL4, respectively.

In the non-display area at the lower side of the display area DA in the context of the figure, a first data testing line 64 is electrically connected to first data lines DL1, which are connected to red sub-pixels R, through the third testing thin film transistors ITr3 and the data link lines DLL, and a first data testing pad IP8 is connected to the first data testing line 64. A second data testing line 66 is electrically connected to second data lines DL2, which are connected to green sub-pixels G, through the third testing thin film transistors ITr3 and the data link lines DLL, and a second data testing pad IP9 is connected to the second data testing line 66. A third data testing line 68 is electrically connected to the third data lines DL3, which are connected to blue sub-pixels B, through the third testing thin film transistors ITr3 and the data link lines DLL, and a third data testing pad IP10 is connected to the third data testing line 68.

A data enable line 70 is connected to gate electrodes of the third testing thin film transistors ITr3, which are electrically connected to the first, second and third data lines DL1, DL2 and DL3, and controls on/off of the third testing thin film transistors ITr3. A data enable pad IP11 is connected to the data enable line 70.

First and second common link lines 71 and 72 are formed in the non-display area to apply a common voltage to a common electrode (not shown) that is formed on a color filter substrate (not shown). First and second common pads IP7 and IP12 are connected to the first and second common link lines 71 and 72, respectively.

Here, the third testing thin film transistors ITr3 connected to the data link lines DLL are positioned in a region where a driving integrated circuit (IC) is attached.

Voltages are applied to the testing pads IP1 to IP12, and on/off of the first, second and third testing thin film transistors ITr1, ITr2 and ITr3 are controlled. Accordingly, an inspecting process is performed to detect defects of the sub-pixels R, G and B in the display area DA.

However, in the related art COG type LCD device 50, block dim effects, which are caused by a partial difference of brightness in the display area DA, continuously occur when the inspecting process is carried out according to an arrangement of bump pads of the driving IC.

Specially, as shown in FIG. 3, which is an enlarged view of a driving IC region of an array substrate for a COG type LCD device according to the related art, if the COG type LCD device includes a driving IC such that a distance between adjacent bump pads in a central portion is wider than other portions in a region for attaching the driving IC, the block dim effects highly occur during the lighting inspection. In FIG. 3, a vacant space of about 2 mm is shown in the central portion differently from the other portions.

In the related art, the first, second and third testing thin film transistors are non-uniformly dry-etched due to loading effects of the spaces between the bump pads and may have different ratios of channel width to length. Accordingly, the first, second and third testing thin film transistors have different characteristics, and this causes block dim effects during the lighting inspection of the COG type LCD device.

More particularly, to connect the gate and the data lines for the lighting inspection, the gate and data lines are connected to output bump pads, which are disposed in the driving IC region, and connected to the driving IC. The testing lines, the testing pads, and the first, second and third testing thin film transistors are connected to the output bump pads and are disposed between the output bump pads and the input bump pads. At this time, distances between the first, second and third thin film transistors are changed in a portion where the space between the bump pads is wider. There is the difference between the thin film transistors due to the non-uniform etching.

Accordingly, it is difficult to accurately judge whether the block dim effects are caused when the driving IC is attached or are caused when the lighting inspection is performed before attaching the driving IC. Therefore, even though there are the block dim effects during the lighting inspection, the COG type LCD device is determined as a good product. Then, when the block dim effects occur after attaching the driving IC, the COG type LCD device is determined as a bad product and is discarded. This increases the manufacturing costs.

SUMMARY OF THE INVENTION

Accordingly, the present invention is directed to a COG type LCD device and an inspecting method of the same that substantially obviates one or more of the problems due to limitations and disadvantages of the related art.

An advantage of the present invention is to provide a COG type LCD device and an inspecting method of the same that include testing lines and testing pads to detect block dim effects before attaching a driving IC.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a COG type LCD device includes a first substrate including a display area and a non-display area surrounding the display area, wherein the non-display area includes first, second, third and fourth non-display areas, gate and data lines in the display area on the first substrate and crossing each other to define pixel regions, switching thin film transistor at each crossing portion of the gate and data lines and connected to the gate and data lines, a pixel electrode in each pixel region and connected to the thin film transistor, first testing thin film transistors in the second non-display area and connected to the data lines, the first testing thin film transistors spaced apart from each other with a constant interval therebetween, first, second and third data testing lines connected to one ends of the data lines through the first testing thin film transistors, wherein the first data testing line is connected to (3n-2)th data lines, the second data testing line is connected to (3n-1)th data lines, and the third data testing line is connected to (3n)th data lines, wherein n is a natural number, first, second and third data testing pads connected to the first, second and third data testing lines, respectively, data link lines in the first non-display area and connected to another ends of the data lines, second testing thin film transistors in the first non-display area and connected to the data link lines, gate link lines connected to the gate lines, third testing thin film transistors connected to the gate link lines, gate testing lines connected to the gate lines through the third testing thin film transistors, gate testing pads connected to the gate testing lines, a common testing line and a common pad in the non-display area, a second substrate spaced apart from the first substrate, a color filter layer and a common electrode sequentially formed on an inner surface of the second substrate, wherein the common electrode is connected to the common testing line, and a liquid crystal layer between the first and second substrates, wherein a driving IC is attached in the first non-display area.

In another aspect, an inspecting method of a chip on glass type liquid crystal display device including a first substrate having pixel electrodes in pixel regions, a second substrate having a common electrode, and a liquid crystal layer between the first and second substrates, wherein the first substrate has a display area and a non-display area, and the non-display area includes first, second, third and fourth non-display areas, includes steps of applying a voltage to gate lines through gate testing pads and turning on switching thin film transistors in the display area, applying a common voltage to the common electrode through one of first and second common pads, applying a first voltage to first, second and third data testing pads and providing a first pixel voltages to the pixel electrode through first, second and third data testing lines and data lines, whereby a first electric field is generated between the pixel electrodes and the common electrode, wherein the first data testing line is connected to (3n-2)th data lines, the second data testing line is connected to (3n-1)th data lines, and the third data testing line is connected to (3n)th data lines, wherein n is a natural number, first providing light to the device and detecting defects of the pixel regions according to transmission of the light caused by the first electric field, stopping applying the first voltage to the first, second and third data testing pads, applying a second voltage to a fourth data testing pad and providing a second pixel voltage to the pixel electrodes through data link lines and the data lines, whereby a second electric field is generated between the pixel electrodes and the common electrode, and second providing light to the device and detecting disconnection of the data link lines according to transmission of the light caused by the second electric field.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiment, an example of which is illustrated in the accompanying drawings.

Figure 1:
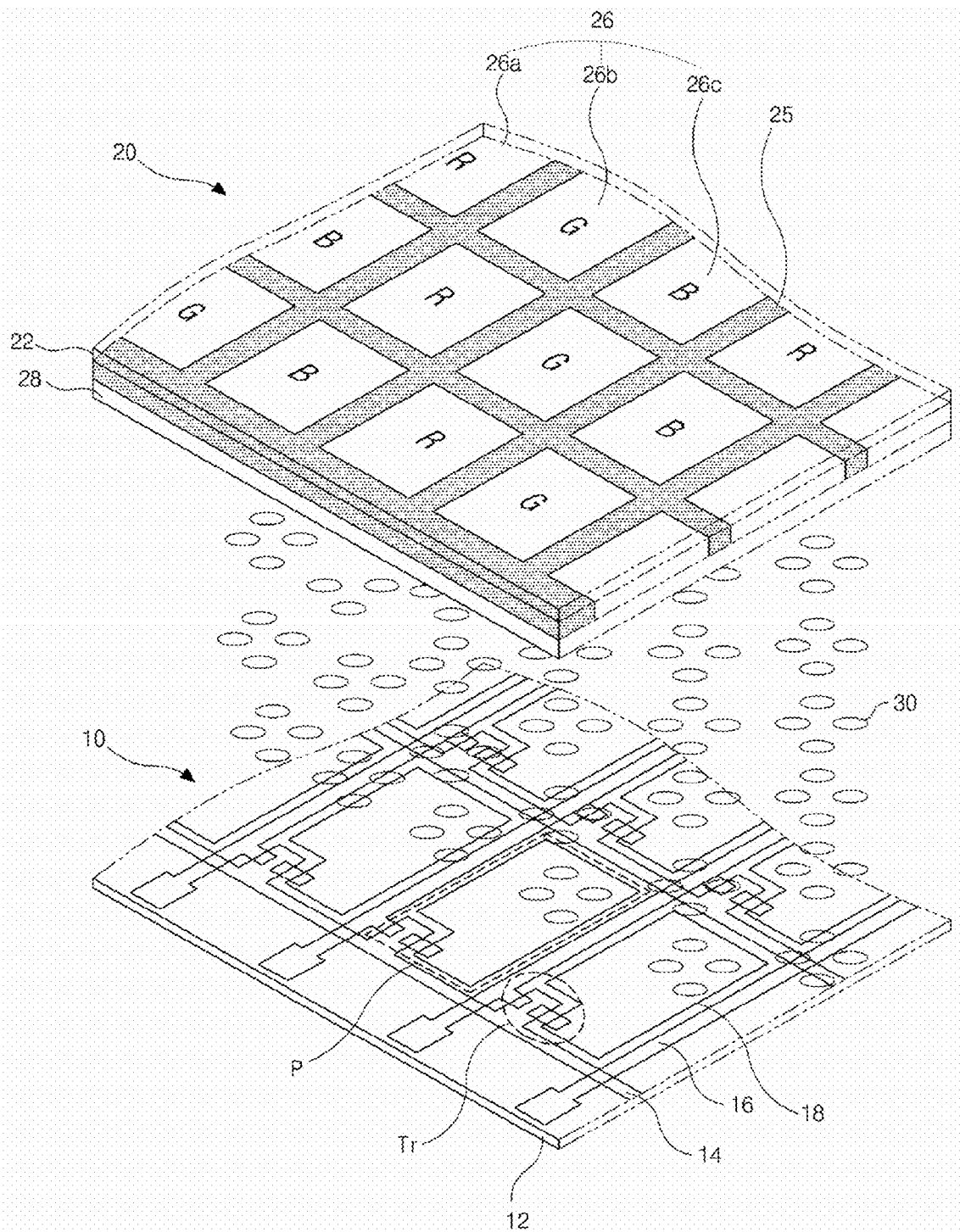
FIG. 1 is an exploded perspective view of an LCD device according to the related art.
Figure 2:
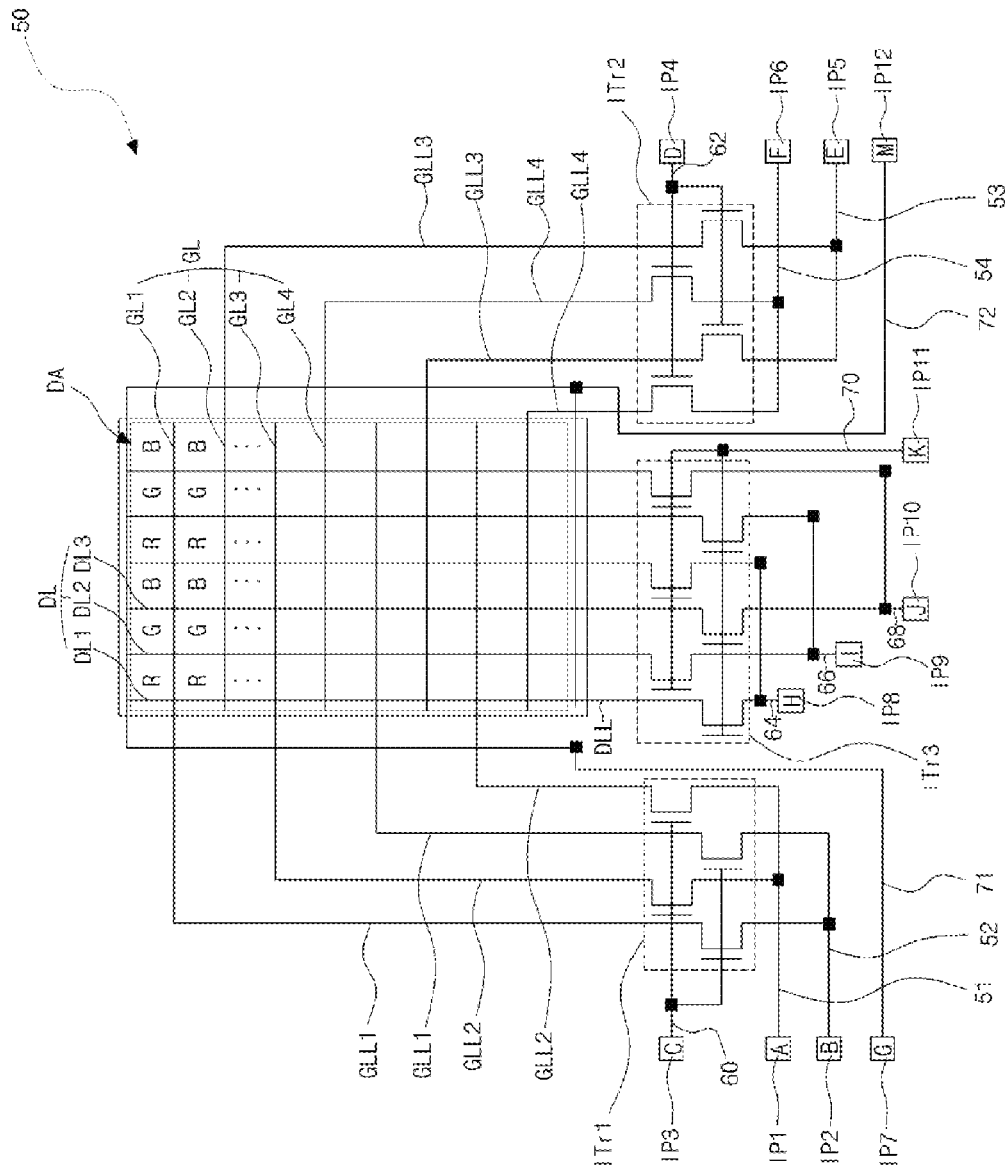
FIG. 2 is a view of schematically illustrating an inspecting structure of a COG type LCD device according to the related art.
Figure 3:
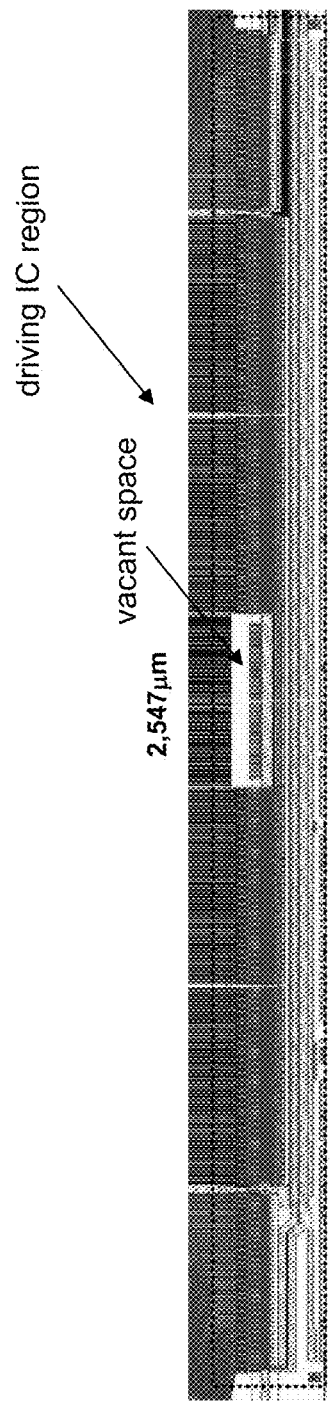
FIG. 3 is an enlarged view of a driving IC region of an array substrate for a COG type LCD device according to the related art.
Figure 4:
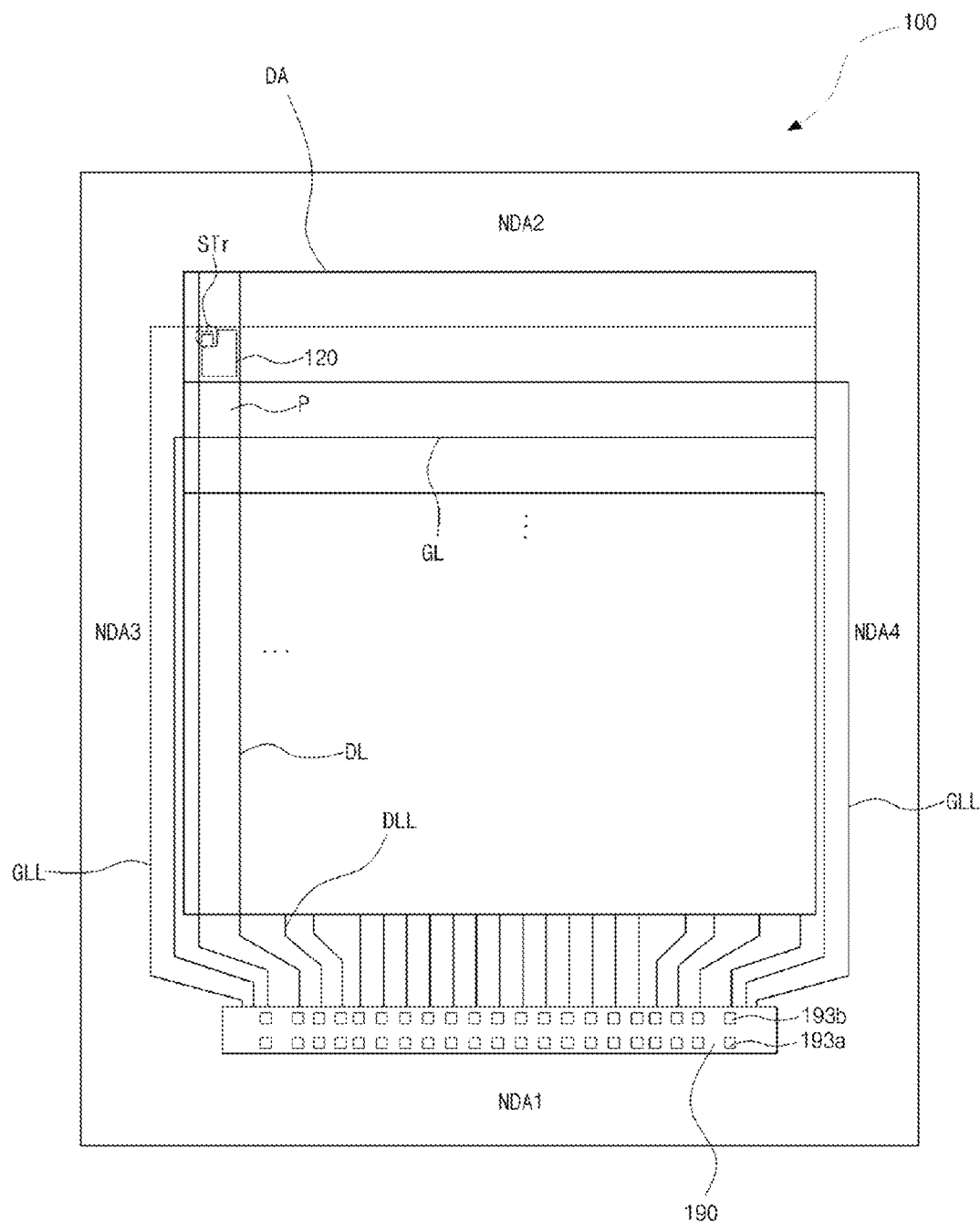
FIG. 4 is a view of schematically illustrating a COG type LCD device according to an embodiment of the present invention.

FIG. 4 is a view of schematically illustrating a COG type LCD device according to an embodiment of the present invention. For convenience of explanation, FIG. 4 mainly shows a structure of an array substrate.

In FIG. 4, the COG type LCD device 100 includes a display area DA and first, second, third and fourth non-display areas NDA1, NDA2, NDA3 and NDA4 outside the display area DA. The first, second, third and fourth non-display areas NDA1, NDA2, NDA3 and NDA4 surround the display area DA. The first, second, third and fourth non-display areas NDA1, NDA2, NDA3 and NDA4 may be disposed at lower, upper, left and right sides of the display area DA, respectively, in the context of the figure.

Gate lines GL and data lines DL are formed in the display area DA on an array substrate and cross each other to define pixel regions P. A switching thin film transistor STr, as a switching element, and a pixel electrode 120 are formed at each pixel region P. The switching thin film transistor STr is connected to the gate and data lines GL and DL and includes a gate electrode, a gate insulating layer, a semiconductor layer, a source electrode and a drain electrode. The pixel electrode 120 is connected to the drain electrode of the switching thin film transistor STr.

A driving IC 190 is disposed in the first non-display area NDA1. Input and output bumps 193a and 193b are formed in a region where the driving IC 190 is attached, wherein the region may be referred to as a driving IC region hereinafter. The output bumps 193b are electrically connected to the gate lines GL and the data lines DL of the display area DA through the gate link lines GLL and the data link lines DLL, respectively.

Although not shown in the figure, first testing thin film transistors are formed between the input and output bumps 193a and 193b in the driving IC region. The first testing thin film transistors control on/off of testing lines. Testing pads, which are connected to the first testing thin film transistors, may be formed in the driving IC region or may be formed in the first non-display area NDA1 excluding the driving IC region.

Second testing thin film transistors (not shown) are formed in the second non-display area NDA2 and are connected to the data lines DL in the display area DA and first, second and third data testing lines (not shown). Gate link lines GLL, which connected to the gate lines GL in the display area DA, and the first, second and third data testing lines (not shown) are formed in the third and fourth non-display areas NDA3 and NDA4.

An inspecting structure of a COG type LCD device according to the present invention will be explained in more detail with reference to the accompanying drawing.

Figure 5:
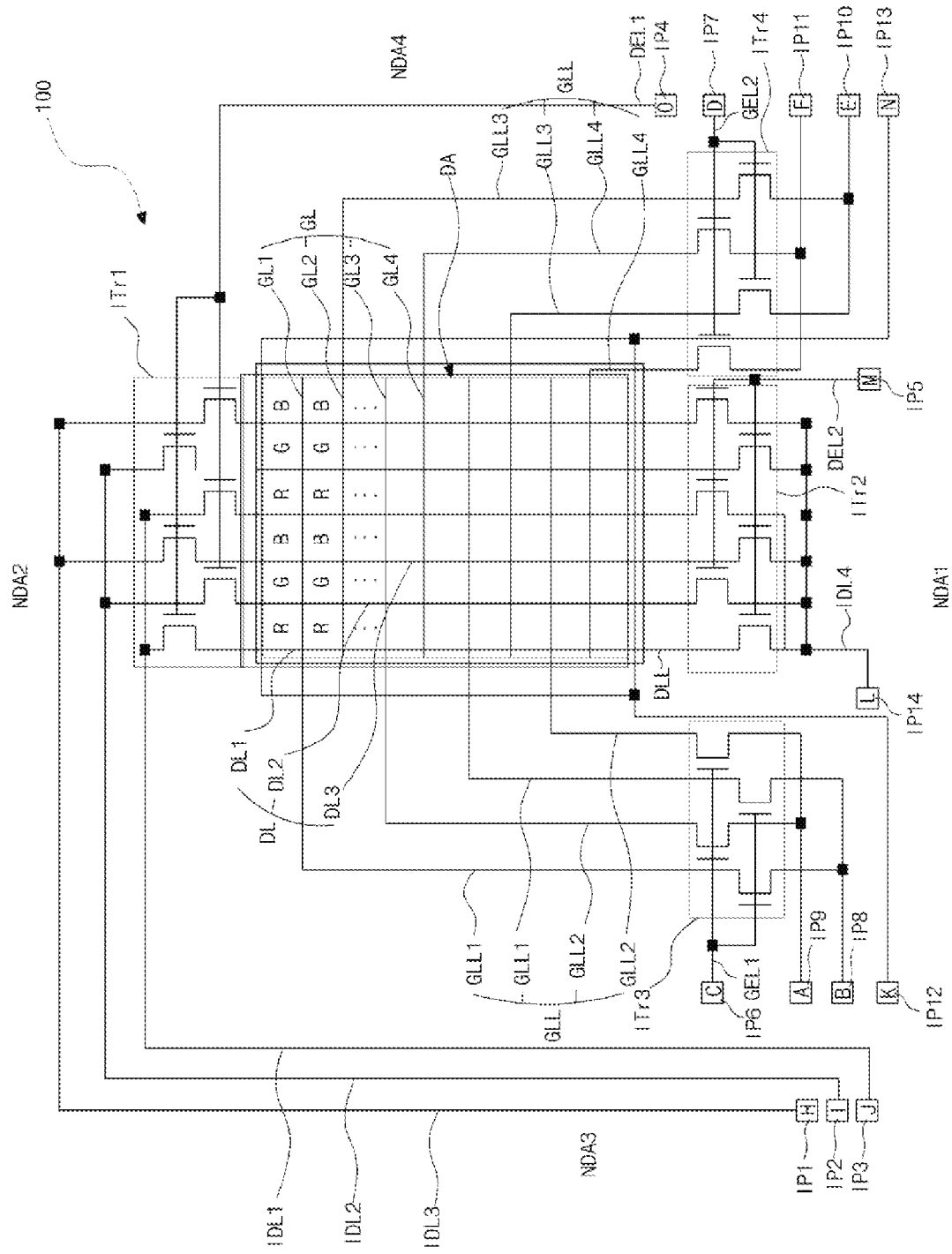
FIG. 5 is a view of schematically illustrating an inspecting structure of a COG type LCD device according to an embodiment of the present invention.

FIG. 5 is a view of schematically illustrating an inspecting structure of a COG type LCD device according to an embodiment of the present invention. For convenience of explanation, a non-display area is exaggeratedly shown as compared with a display area.

In FIG. 5, the COG type LCD device 100 includes a display area DA and first, second, third and fourth non-display areas NDA1, NDA2, NDA3 and NDA4. The first, second, third and fourth non-display areas NDA1, NDA2, NDA3 and NDA4 may be disposed at lower, upper, left and right sides of the display area DA, respectively, in the context of the figure.

Gate link lines GLL, first, second and third data testing lines IDL1, IDL2 and IDL3, and a first data enable line DEL1 are formed in the third and fourth non-display areas NDA3 and NDA4. The gate link lines GLL are connected to gate lines GL formed in the display area DA. The first, second and third data testing lines IDL1, IDL2 and IDL3 are electrically connected to data lines DL formed in the display area DA.

First testing thin film transistors ITr1 are formed in the second non-display area NDA2. The first testing thin film transistors ITr1 may be connected to the data lines DL and spaced apart from each other with the same pitch as the data lines DL. The first testing thin film transistors ITr1 may be arranged in two rows.

Testing pads IP1 to IP14, data link lines DLL, a second data enable line DEL2 and a fourth data testing line IDL4 are formed in the first non-display area NDA1. Each of the first testing thin film transistors ITr1 are electrically connected to one of first, second and third data testing pads IP1, IP2 and IP3 through the first, second and third data testing lines IDL1, IDL2 and IDL3. Some of the testing pads IP1 to IP14 are electrically connected to the gate link lines GLL and the data link lines DLL through second, third and fourth testing thin film transistors ITr2, ITr3 and ITr4. The data link lines DLL are connected to the data lines DL. The second data enable line DEL2 is connected to gate electrodes of the second testing thin film transistors ITr2, which are connected to the data link lines DLL. The fourth data testing line IDL4 is connected to source electrodes of the second testing thin film transistors ITr2.

The COG type LCD device of the present invention may have more testing pads than the related art COG type LCD device.

In the present invention, the testing pads include the first, second and third data testing pads IP1, IP2 and IP3, first and second data enable pads IP4 and IP5, first and second gate enable pads IP6 and IP7, first, second, third and fourth gate testing pads IP8, IP9, IP10 and IP11, first and second common pads IP12 and IP13, and a fourth data testing pad IP14. The first, second and third data testing pads IP1, IP2 and IP3 are electrically connected to the data lines GL of red, green and blue sub-pixels R, G and B, respectively. The fourth data testing pad IP14 is electrically connected to the data link lines DLL.

More particularly, the first data testing pad IP1 is electrically connected to first data lines DL1 connected to the red sub-pixels R. The second data testing pad IP2 is electrically connected to second data lines DL2 connected to the green sub-pixels G. The third data testing pad IP3 is electrically connected to third data lines DL3 connected to the blue sub-pixels B. At this time, the first testing thin film transistors ITr1 connected to the first data lines DL1 are connected to the first data testing line IDL1, which is connected to the first data testing pad IP1. The first testing thin film transistors ITr1 connected to the second data lines DL2 are connected to the second data testing line IDL2, which is connected to the second data testing pad IP2. The first testing thin film transistors ITr1 connected to the third data lines DL3 are connected to the third data testing line IDL3, which is connected to the third data testing pad IP3.

Gate electrodes of the first testing thin film transistors ITr1 are connected to the first data enable line DEL1, which is connected to the first data enable pad IP4.

Since the data lines DL in the display area DA are spaced apart from each other with a constant distance therebetween, the first testing thin film transistors ITr1, which are disposed in the second non-display NDA2 and connected to ends of the data lines DL, can have a constant interval therebetween and have an enough size differently from the related art. Accordingly, when a dry-etching process is performed, non-uniformity due to loading effects does not occur, and thin film transistors having uniform characteristics can be formed. Therefore, there is no block dim effect during the inspecting process. The characteristics of the thin film transistors are affected by the ratio of channel width to length (W/L). In the related art, since all the testing thin film transistors are formed restrictedly in the driving IC region, there are limitations on the interval and the size. On the other hand, in the present invention, the first testing thin film transistors ITr1 can be formed in the entire of the second non-display area NDA2, which is larger than the driving IC region, and thus the first testing thin film transistors ITr1 can have a larger size than those of the relate art. Therefore, the first testing thin film transistors ITr1 can be formed stably to have uniform characteristics.

Meanwhile, in the present invention, the data link lines DLL in the first non-display area NDA1 are connected to ends of the data lines DL in the display area DA. The data link lines DLL are also connected to output bumps (not shown) formed in a driving IC region and connected to the second testing thin film transistors ITr2, which are disposed between the output bumps (not shown) and the input bumps (not shown).

As stated above, the fourth data testing line IDL4 is disposed in the first non-display area NDA1. The fourth data testing line IDL4 is connected to the second testing thin film transistors ITr2 and the fourth testing pad IP14. The fourth data testing line IDL4 may be connected to the source electrodes of the second testing thin film transistors ITr2.

Additionally, the second data enable line DEL2 is positioned in the first non-display area NDA1. The second data enable line DEL2 is connected to the gate electrodes of the second testing thin film transistors ITr2 and the second data enable pad IP5.

Even though the second testing thin film transistors ITr2 are shown to have a constant distance therebetween like the first testing thin film transistors ITr1, the second testing thin film transistors ITr2 in the driving IC region may have different intervals therebetween when there is a vacant space in a central portion of an area where the output bumps (not shown) are formed.

Here, the second testing thin film transistors ITr2 are not connected to the first, second and third testing lines IDL1, IDL2 and IDL3 for respective lighting tests of the red, green and blue sub-pixels R, G and B. The second testing thin film transistors ITr2 are connected to the fourth data testing line IDL4, which is electrically connected to the data lines DL. The fourth data testing pad IP14 is formed at an end of the fourth data testing line IDL4. The fourth data testing line IDL4 and the fourth data testing pad IP14 are not used for inspecting lighting of the sub-pixels R, G and B and are used for detecting disconnections of the data link lines DLL, which connect the data lines DL with the output bumps (not shown) contacting the driving IC (not shown).

Accordingly, when the lighting inspection is performed using the fourth data testing pad IP14, even though the characteristics of the second testing thin film transistors ITr2 are changed and the block dim effects occur, there is no problem because substantial block dim effects are detected using the first, second and third data testing pads IP1, IP2 and IP3.

Here, the lighting inspection using the fourth data testing pad IP14 is performed to detect defects of the data link lines DLL, which connect the data lines DL with the output bumps (not shown) contacting the driving IC (not shown).

In the related art, since the lighting inspection for detecting defects of the red, green and blue sub-pixels is performed using the data link lines connected to the data lines, the defects of the data link lines and the data lines are also detected in addition to the block dim effects.

However, in the present invention, the defects of the red, green and blue sub-pixels R, G and B are detected using portions extending from the data lines DL and disposed in the second non-display area NDA2 not using the data link lines DLL. Thus, it is possible to detect the disconnections of the data lines DL, and it is not possible to detect the defects of the data link lines DLL, which connect the data lines DL with the output bumps (not shown) connected to the driving IC (not shown). Accordingly, the fourth data testing pad IP14 and the second data enable pad IP5 are additionally formed to detect the defects of the data link lines DLL, such as disconnection.

In this case, even though the second testing thin film transistors ITr2 have different characteristics, there is no problem. The second testing thin film transistors ITr2 can have relatively a low ratio of channel width to length differently from the first testing thin film transistors ITr1, and thus the second testing thin film transistors ITr2 can have smaller sizes than the related art. Therefore, spaces between the input bumps (not shown) and the output bumps (not shown) can be decreased as compared with the related art, and the size of the driving IC (not shown) can be reduced.

In the meantime, the first gate enable pad IP6 and the first and second gate testing pads IP8 and IP9 are formed at a left side in the first non-display area NDA1. The second gate enable pad IP7 and the third and fourth gate testing pads IP10 and IP11 are formed in a right side of the first non-display area NDA1. The first and second gate testing pads IP8 and IP9 are electrically connected to the odd gate lines GL1 and GL3 through the first and second gate link lines GLL1 and GLL2 in the left side of the display area DA. The third and fourth gate testing pads IP10 and IP11 are electrically connected to the even gate lines GL2 and GL4 through the third and fourth gate link lines GLL3 and GLL4 in the right side of the display area DA. Meanwhile, the first and second gate testing pads IP8 and IP9 are connected to the third testing thin film transistors ITr3 through first and second gate testing lines, which are not marked in the figure, and the third and fourth gate testing pads IP10 and IP11 are connected to the fourth testing thin film transistors ITr4 through third and fourth gate testing lines, which are not marked in the figure.

The first gate link line GLL1 is connected to first odd gate lines GL1, which are (4n-3)th gate lines, wherein n is a natural number, and the third testing thin film transistors ITr3. The second gate link line GLL2 are connected to second odd gate lines GL3, which are (4n-1)th gate lines, and the third testing thin film transistors ITr3. The third gate link lines GLL3 are connected to first even gate lines GL2, which are (4n-2)th gate lines, and the fourth testing thin film transistors ITr4. The fourth gate link lines GLL4 are connected to second even gate lines GL4, which are (4n)th gate lines, and the fourth testing thin film transistors ITr4.

The first gate enable line GEL1 is connected to all the gate electrodes of the third testing thin film transistors ITr3, which are connected to the first or second gate link lines GLL1 or GLL2. The first gate enable pad IP6 is disposed at an end of the first gate enable line GEL1. The second gate enable line GEL2 is connected to all the gate electrodes of the fourth testing thin film transistors ITr4, which are connected to the third or fourth gate link lines GLL3 or GLL4. The second gate enable pad IP7 is disposed at an end of the second gate enable line GEL2.

Additionally, the first and second common pads IP12 and IP13 are disposed in the first non-display area NDA1 in order to apply a common voltage, as a reference voltage, to a common electrode (not shown), which is formed on a color filter substrate (not shown) facing and spaced apart from the array substrate. First and second common testing lines, which are not marked, may be formed in the non-display area, are connected to the first and second common pads IP12 and IP13.

The color filter substrate (not shown) includes a color filter layer (not shown) and the common electrode (not shown) on a surface facing the array substrate. The color filter layer has red, green and blue color filter patterns which are sequentially repeatedly arranged to correspond to the red, green and blue sub-pixels, respectively. The common electrode corresponds to the entire display area DA. The color filter substrate is disposed over the array substrate with a liquid crystal layer (not shown) therebetween to constitute the COG type LCD device 100 according to the present invention.

In the COG type LCD device according to the present invention, among the non-display areas NDA1, NDA2, NDA3 and NDA4 outside the display area DA, the first testing thin film transistors ITr1 are formed with a constant interval therebetween in the second non-display area NDA2 that is opposite to the first non-display area NDA1, where the driving IC (not shown) is attached, with respect to the display area DA. Accordingly, when the lighting inspection is performed, the block dim effects can be prevented which are caused by the difference in characteristics of the thin film transistors due to difference intervals resulting from the design of the driving IC (not shown) because the first testing thin film transistors ITr1 connected to the data lines DL are formed in the driving IC region.

Moreover, in the driving IC region, the sizes of the thin film transistors, which are formed between the input bumps (not shown) and the output bumps (not shown), can be decreased in comparison with the related art, and thus the spaces between the input bumps and the output bumps can be decreased. Therefore, a compact driving IC can be used, and the manufacturing costs can be reduced.

An inspecting method of the COG type LCD device according to the present invention will be explained hereinafter.

A predetermined voltage, which is greater than threshold voltages of the third testing thin film transistors ITr3, is applied to the third testing thin film transistors ITr3 through the first gate enable pad IP6, and the third thin film transistors ITr3 turn on. Then, a predetermined voltage, which is greater than threshold voltages of the switching thin film transistors in the pixel regions P, is applied to the first gate testing pad IP8, and the switching thin film transistors, which are connected to the (4n-3)th gate lines GL1 connected to the first gate link lines GLL1, turn on. Next, a predetermined voltage, which is greater than threshold voltages of the first testing thin film transistors ITr1, is applied to the first testing thin film transistors ITr1 through the first data enable pad IP4, and the first testing thin film transistors ITr1, which are disposed in the second non-display area NDA2 and connected to the ends of the data lines DL, turn on. A common voltage is applied to the common electrode (not shown) on the color filter substrate (not shown) through the first common pad IP12, and predetermined voltages are applied to the first, second and third data testing pads IP1, IP2 and IP3. Thus, pixel voltages are applied to the pixel electrodes (not shown) in the pixel regions connected to the (4n-3)th gate lines, that is, the first odd gate lines GL1, through the first, second and third data lines DL1, DL2 and DL3. The pixel voltages may be sequentially applied.

Accordingly, an electric field is generated between the common electrode (not shown) on the color filter substrate (not shown) and the pixel electrodes (not shown), and liquid crystal molecules of the liquid crystal layer (not shown) between the array substrate and the color filter substrate are rearranged, whereby lights emanated from a light-emitting means (not shown) of an inspecting apparatus is transmitted, and red, green and blue lights are shown. Here, defects of the sub-pixels can be detected because there is no light in the pixel regions having defects. In addition, when the data lines or the gate lines are disconnected, there is no light in the pixel regions connected to the disconnected lines, and the line defects can be detected.

By repeating the same processes, defects of the pixel regions P connected to the second odd gate lines GL3, defects of the pixel regions connected to the first and second even gate lines GL2 and GL4, and disconnection of the lines are detected, and a first lighting inspection is completed.

After the first lighting inspection for detecting the defects of the pixel regions P, a second lighting inspection may be performed. In the second lighting inspection, predetermined voltages are applied to the third and fourth testing thin film transistors ITr3 and ITr4 through the first and second gate enable pads IP6 and IP7, and the third and fourth testing thin film transistors ITr3 and ITr4 turn on. A predetermined voltage is applied to the second testing thin film transistors ITr2 through the second data enable pad IP5, and the second testing thin film transistors ITr2 turn on. Next, a predetermined voltage is applied to the fourth data testing pad IP14, and disconnection of the data link lines DLL connected to the data lines DL is detected. In this case, if there is no disconnection, lights should be transmitted in all the pixel regions P of the display area DA. If there is disconnection of the data link lines DLL, lights are not transmitted in the pixel regions P connected to the disconnected data link line DLL.

Like this, in the COG type LCD device according to the present invention, the first and second lighting inspections are performed, and the defects can be accurately detected without the block dim effects before attaching the driving IC.

In the COG type LCD device according to the present invention, the testing thin film transistors, which are connected to the data lines and the data testing lines, are disposed in the non-display area, which is opposite to the driving IC region with respect to the display area, such that the testing thin film transistors have a constant interval therebetween regardless of the design of the driving IC. Therefore, the block dim effects can be prevented.

Moreover, the block dim effects can be accurately judged, and an increase of manufacturing costs due to misjudgment can be prevented.

In addition, additional testing lines and pads for detecting the disconnection of the data link lines are provided, and more detail inspection of the array substrate can be made.

Furthermore, the spaces between the input bumps and the output bumps can be decreased, and the size of the driving IC can be reduced. Accordingly, the manufacturing costs can be lowered.

It will be apparent to those skilled in the art that various modifications and variations can be made in the COG type LCD device of the present invention without departing from the spirit or scope of the invention. Thus, it is intended that the present invention cover the modifications and variations of this invention provided they come within the scope of the appended claims and their equivalents.

What is claimed is:

1. A chip on glass type liquid crystal display device, comprising:
 a first substrate including a display area and a non-display area surrounding the display area, the non-display area including first, second, third, and fourth non-display areas;
 gate and data lines in the display area on the first substrate and crossing each other to define pixel regions;
 switching thin film transistor at each crossing portion of the gate and data lines and connected to the gate and data lines;
 a pixel electrode in each pixel region and connected to the thin film transistor;
 first testing thin film transistors in the second non-display area and connected to the data lines, the first testing thin film transistors being spaced apart from each other with a constant interval therebetween;
 first, second, and third data testing lines connected to one ends of the data lines through the first testing thin film transistors, the first data testing line being connected to $(3n-2)^{th}$ data lines, the second data testing line is connected to $(3n-1)^{th}$ data lines, and the third data testing line is connected to $(3n)^{th}$ data lines, n being a natural number;
 first, second, and third data testing pads respectively connected to the first, second, and third data testing lines;
 data link lines in the first non-display area and directly respectively connected to the other ends of the data lines in the display area;
 second testing thin film transistors in the first non-display area and connected to the data link lines;
 gate link lines connected to the gate lines;
 third testing thin film transistors connected to the gate link lines;
 gate testing lines connected to the gate lines through the third testing thin film transistors;
 gate testing pads connected to the gate testing lines;
 a common testing line and a common pad in the non-display area;
 a second substrate spaced apart from the first substrate;
 a color filter layer and a common electrode sequentially formed on an inner surface of the second substrate, the common electrode being connected to the common testing line;
 a liquid crystal layer between the first and second substrates;
 fourth testing thin film transistors connected to the gate link lines,
 wherein the gate link lines include first, second, third, and fourth gate link lines,
 wherein the third testing thin film transistors are connected to the first and second gate link lines, wherein the fourth testing thin film transistors are connected to the third and fourth gate link lines,
wherein a driving IC is attached in the first non-display area,
wherein a single data testing line is connected to source electrodes of all the second testing thin film transistors,
wherein a single data enable line is connected to gate electrodes of all the second testing thin film transistors,
wherein the display area has a rectangular shape consisting of first, second, third, and fourth sides with the first and second sides being opposite to each other and with the third and fourth sides being opposite to each other, and the first, second, third, and fourth non-display areas correspond to the first, second, third, and fourth sides, respectively,
wherein the second testing thin film transistors and the driving IC are disposed in the first non-display area,
wherein the data lines extend in a direction from the first non-display area to the second non-display area,
wherein the other ends of the data lines are disposed between the one ends of the data lines and the driver IC,
wherein the first testing thin film transistors are at an opposite end of the display area from the second, third, and fourth testing thin film transistors, and
wherein each data line is respectively connected to one of the first testing thin film transistors at one end and to one of the second testing thin film transistors at an opposite end.

2. The device according to claim 1, wherein the first non-display area is directly opposite to the second non-display area with respect to the display area such that the display area is directly between the first and second non-display areas.

3. The device according to claim 1, further comprising:
a first data enable line connected to gate electrodes of the first testing thin film transistors;
a first data enable pad connected to the first data enable line;
a second data enable line connected to the gate electrodes of the second testing thin film transistors;
a second data enable pad connected to the second data enable line;
a fourth data testing line connected to the source electrodes of the second testing thin film transistors; and
a fourth data testing pad connected to the fourth data testing line.

4. The device according to claim 2, wherein:
the gate lines include:
first and second odd gate lines; and
first and second even gate lines;
wherein the first odd gate lines correspond to $(4m-3)^{th}$ gate lines;
the second odd gate lines correspond to $(4m-1)^{th}$ gate lines;
the first even gate lines correspond to $(4m-2)^{th}$ gate lines;
the second even gate lines correspond to $(4m)^{th}$ gate line; and
m is a natural number.

5. The device according to claim 4, wherein the first, second, third and fourth gate link lines are respectively connected to the first odd, second odd, first even, and second even gate lines.

6. The device according to claim 5, wherein the gate testing lines include first, second, third, and fourth gate testing lines respectively connected to the first, second, third, and fourth gate link lines through the third and fourth testing thin film transistors.

7. The device according to claim 6, wherein the gate testing pads include first, second, third, and fourth gate testing pads respectively connected to the first, second, third, and fourth gate testing lines.

8. The device according to claim 7, further comprising:
a first gate enable line connected to gate electrodes of the third testing thin film transistors;
a first gate enable pad connected to the first gate enable line;
a second gate enable line connected to gate electrodes of the fourth testing thin film transistors; and
a second gate enable pad connected to the second gate enable line.

9. The device according to claim 8, wherein the first, second, third, and fourth data testing pads, the first and second data enable pads, the first, second, third, and fourth gate testing pads, the first and second gate enable pads, and the common pad are disposed in the first non-display area.

10. The device according to claim 8, wherein the second testing thin film transistors are disposed between output bumps and input bumps in an area for attaching the driving IC.

* * * * *